No. 726,616. PATENTED APR. 28, 1903.
L. A. ASPINWALL.
LIQUID SPRAYER.
APPLICATION FILED FEB. 3, 1902.
NO MODEL. 2 SHEETS—SHEET 1.

Witnesses:
J. Staib
Chas. H. Smith

Inventor:
Lewis A. Aspinwall
per L. W. Serrell & Son
attys.

No. 726,616. PATENTED APR. 28, 1903.
L. A. ASPINWALL.
LIQUID SPRAYER.
APPLICATION FILED FEB. 3, 1902.
NO MODEL. 2 SHEETS—SHEET 2.
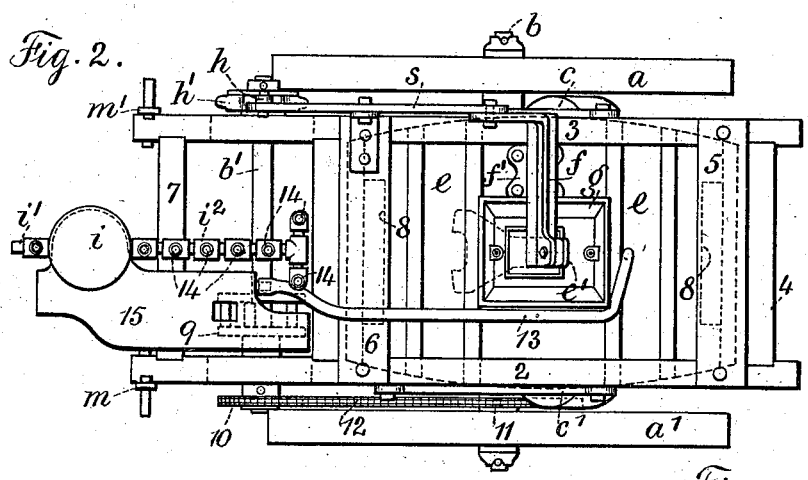
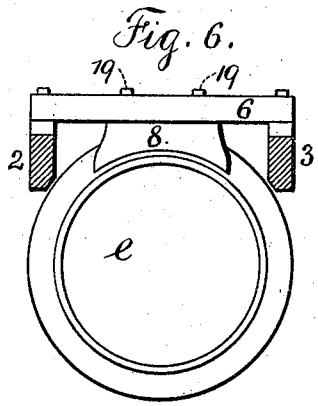
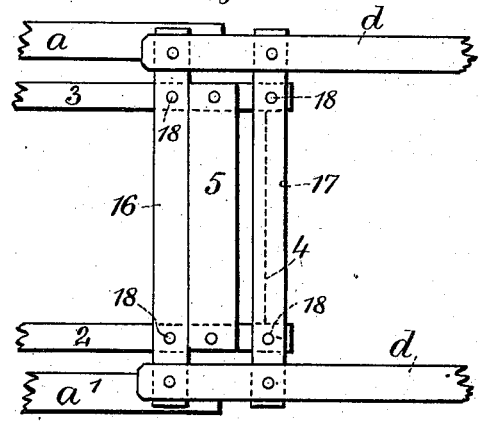
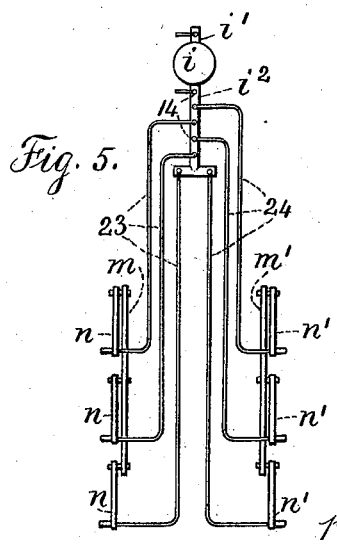
Witnesses:
J. Stail
Chas. H. Smith
Inventor:
Lewis A. Aspinwall
per L. W. Serrell & Son
Attys.

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

LIQUID-SPRAYER.

SPECIFICATION forming part of Letters Patent No. 726,616, dated April 28, 1903.

Application filed February 3, 1902. Serial No. 92,236. (No model.)

*To all whom it may concern:*

Be it known that I, LEWIS AUGUSTUS ASPINWALL, a citizen of the United States, residing at Jackson, in the county of Jackson and State of Michigan, United States of America, have invented an Improvement in Liquid-Sprayers, of which the following is a specification.

My present invention is an improvement upon the devices shown and described in my Patent No. 653,333, dated July 10, 1900, and the present application shows an analogous structure to that shown in the pending application of like date herewith, the devices of both applications including some of the features shown and described in the aforesaid patent.

The devices of my present invention are applicable for general purposes for spraying plants or growing vegetables with liquid and especially applicable for spraying cotton-plants, the object being to destroy insects or animal life injurious to such growing plants or vegetables.

In carrying out my invention the liquid-holding barrel is suspended from a frame structure, the barrel coming beneath the frame and the frame and barrel supported by brackets to the axle of a pair of wheels, the device being especially adapted to be moved between two rows of plants. Therefore the apparatus is comparatively narrow in width. In connection with some of the parts of the aforesaid patent and mounted upon the aforesaid frame I employ an arrangement of spraying devices so placed that the adjacent sides of two rows of plants are simultaneously sprayed, said spraying devices being vertically arranged and of such form that their degree of inclination can be altered at pleasure.

The details of the construction of the device are hereinafter more particularly set forth.

Figure 1:
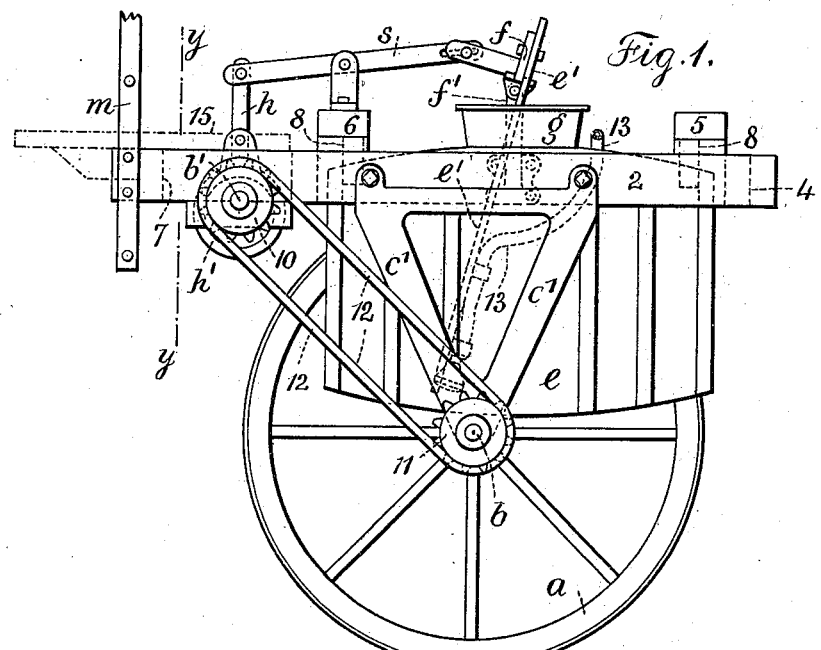
Figure 3:
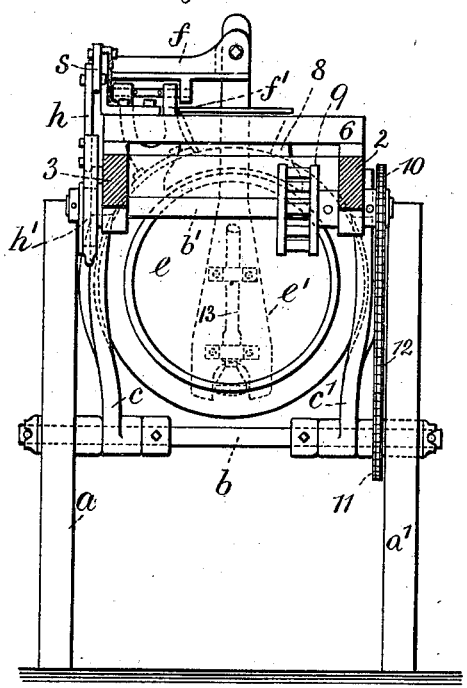
Figure 4:
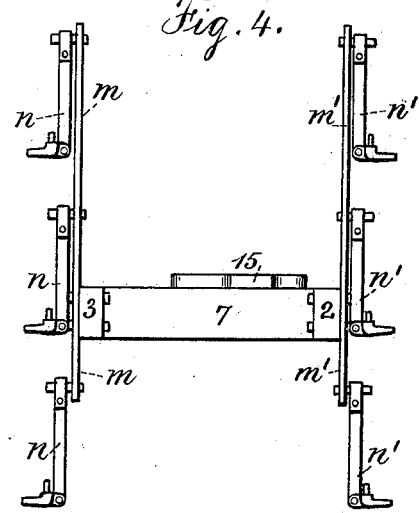

In the drawings, Figure 1 is an elevation with the shafts removed; Fig. 2, a plan, and Fig. 3 an elevation and partial section at $y$ $y$ of Fig. 1, representing my invention. Fig. 4 is a rear view showing the uprights for carrying the arms and spray-nozzles connected therewith. Fig. 5 is a diagrammatic view showing the distribution of the liquid to the different spray-nozzles. Fig. 6 is a cross-section and elevation showing the manner of supporting the barrel from the frame; and Fig. 7 is a plan view of the front of the frame and wheels, showing the manner of connecting the shafts to the frame and also indicating the fact that the shafts and the parts connecting the same to the frame are preferably narrower in their width than the extreme measurement over the wheels.

The wheels $a$ $a'$ are of the wide-tread pattern and are mounted upon an axle $b$. The frame is composed of side bars 2 3 and transverse bars 4, 5, 6, and 7, and a pair of brackets $c$ $c'$ is secured to the side bars of the frame and extend downward therefrom to engagement with the axle, said axle passing through tubular portions at the lower ends of the brackets. The water-barrel $e$ is suspended from the transverse bars 5 6 and below intervening curved steadying-blocks 8 by bolts 19, which pass through said transverse parts through the blocks and the barrel, the barrel being below and between the side bars 2 3 and the brackets $c c'$ being slightly curved to pass over the sides of the barrel.

The water-barrel is provided with a paddle $e'$ or equivalent liquid-stirring device, a rocking support $f$, pivotally mounted upon the bracket $f'$, secured upon the barrel, is provided and the said paddle $e'$ is connected to said rocking support. The paddle passes through a filling-hopper $g$, secured upon the upper surface of the barrel and through which the liquid for spraying purposes is delivered into the barrel. A shaft $b'$ extends transversely of the frame and is mounted in suitable bearings connected to the side bars 2 3. Upon one end of the shaft is an eccentric $h'$, from which an arm $h$ rises, and a rocker-arm $s$, pivotally connected to a standard upon the frame, is at one end connected to the arm $h$ and at the other end to an arm of the rocking support $f$. Upon the other end of the shaft $b'$ is a sprocket 10, and upon the main axle $b$ is a sprocket 11, and the chain 12 passes around the sprockets to rotate the shaft $b'$ with the movement of the spraying-machine. Upon this shaft $b'$ is a lantern-wheel 9, similar to the one described in my aforesaid patent and application and employed for the same purpose—namely, for operating the pump.

The platform 15 supports the pump and the air-chamber $i$, and a discharge-pipe 13, connected to the paddle $e'$ at one end, which terminates in a nozzle fitting within the recess at the bottom of the paddle, and passing out of the liquid-holding barrel the pipe 13 is at its other end connected to the pump device upon the platform 15. Pipes $i'$ $i^2$ extend in opposite directions from the air-chamber $i$, and they are provided with discharge-orifices 14. I provide uprights $m$ $m'$, connected to and supported by the frame parts and side bars 2 3. These are located adjacent to the transverse bar 7, and series of pivoted arms carrying spray-nozzles on their ends are mounted, the one over the other, upon these uprights $m$ $m'$. These arms are pivoted and are adapted to be swung to change their height from the ground or their relation to one another, so as not only to accommodate the height of growing plants, but the parts of the same to be sprayed.

Series of hose 23 and 24 extend from the orifices 14 to the spray-nozzles of the arms $n$ $n'$, so that the liquid to be sprayed is carried direct from the pipe $i^2$ to the said spraying-nozzles.

The shafts $d$ are connected to cross-bars 16 17, and they in turn are connected by bolts 18 to the side bars 2 3 in front of and behind the transverse bar 5. This construction is especially shown in Fig. 7, in which it also appears that the said shafts $d$ and the cross-bars connecting the same are not wider than the extreme width over the wheels $a$ $a'$, and from Figs. 2 and 3 it will be further seen that all the upright parts of the machine are within the extreme measurement of the wheels, and the machine is made narrow, so as to pass through the space between the two rows of plants, the spraying devices being adapted to deliver the spraying liquid upon the adjacent sides of the two rows as the machine moves between the rows.

In this device, as well as in the device of my copending application, the paddle is actuated by the rocking lever and the devices connected therewith and set in motion by the movement of the machine over the ground.

I claim as my invention—

1. A liquid-spraying device comprising a frame structure, an axle, a pair of wheels and brackets connected to the sides of the frame structure and carried by the axle, a liquid-holding barrel suspended from the frame and between the same, the axle and the brackets and placed longitudinally of the frame, shafts for the animal drawing the liquid-spraying device, cross-bars connecting the rear ends of the shafts together, and bolts for securing the same to the side members of the frame structure at opposite sides of the forward transverse member, a pump, a pipe $i^2$ having discharge-orifices therein, a connection from said pump to said pipe, a hose from said pump to the said barrel, uprights supported by the frame at either side thereof, arms pivoted one above the other to said uprights, spraying-nozzles connected to said arms, and hose connections from the said arms to the said orifices, substantially as set forth.

2. A liquid-spraying device comprising a frame structure, an axle, a pair of wheels and brackets connected to the sides of the frame structure and carried by the axle, a liquid-holding barrel suspended from the frame and between the same, the axle and the brackets and placed longitudinally of the frame, a pump, a pipe $i^2$ having discharge-orifices therein, a connection from said pump to said pipe, a hose from said pump to the said barrel, uprights supported by the frame at either side thereof, arms pivoted one above the other to said uprights, spraying-nozzles connected to said arms, and hose connections from the said arms to the said orifices, substantially as set forth.

3. A liquid-spraying device comprising a frame structure, an axle, a pair of wheels and brackets connected to the sides of the frame structure and carried by the axle, a liquid-holding barrel suspended from the frame and between the same, the axle and the brackets and placed longitudinally of the frame, shafts for the animal drawing the liquid-spraying device, cross-bars connecting the rear ends of the shafts together, and bolts for securing the same to the side members of the frame structure at opposite sides of the forward transverse member, the said shafts and their connecting-bars being not wider than the width across the wheels, a pump, a pipe $i^2$ having discharge-orifices therein, a connection from said pump to said pipe, a hose from said pump to the said barrel, uprights supported by the frame at either side thereof, arms pivoted one above the other to said uprights, spraying-nozzles connected to said arms, and hose connections from the said arms to the said orifices, substantially as set forth.

Signed by me this 18th day of December, 1901.

LEWIS AUGUSTUS ASPINWALL.

Witnesses:
W. C. SHANAFELT,
GEO. N. WHITNEY.